United States Patent
Ruping

(10) Patent No.: US 7,693,554 B2
(45) Date of Patent: Apr. 6, 2010

(54) METHOD FOR OPERATING A DATA STORAGE MEDIUM

(75) Inventor: Stefan Ruping, Lengdorf (DE)

(73) Assignee: Infineon Technologies AG, Neubiberg (DE)

( * ) Notice: Subject to any disclaimer, the term of this patent is extended or adjusted under 35 U.S.C. 154(b) by 782 days.

(21) Appl. No.: 11/221,382

(22) Filed: Sep. 6, 2005

(65) Prior Publication Data

US 2006/0036902 A1 Feb. 16, 2006

Related U.S. Application Data

(63) Continuation of application No. PCT/DE2004/000431, filed on Mar. 5, 2004.

(30) Foreign Application Priority Data

Mar. 7, 2003 (DE) ............................... 103 10 138

(51) Int. Cl.
| | |
|---|---|
| H04B 1/38 | (2006.01) |
| H04B 1/04 | (2006.01) |
| H04B 1/16 | (2006.01) |
| H01Q 11/12 | (2006.01) |
| G06K 5/00 | (2006.01) |
| G06K 19/00 | (2006.01) |
| G06K 19/06 | (2006.01) |
| H03H 11/26 | (2006.01) |
| G06F 1/04 | (2006.01) |
| G06F 17/10 | (2006.01) |
| G06F 17/14 | (2006.01) |
| G06F 1/00 | (2006.01) |
| G06F 11/30 | (2006.01) |
| G06F 5/06 | (2006.01) |
| H03K 3/00 | (2006.01) |
| H03L 5/00 | (2006.01) |
| G11C 5/14 | (2006.01) |
| G11C 8/00 | (2006.01) |
| G11C 8/18 | (2006.01) |

(52) U.S. Cl. ................. 455/574; 455/127.1; 455/343.1; 235/380; 235/487; 235/492; 327/276; 327/291; 327/333; 365/226; 365/233.14; 708/312; 708/490; 713/323; 713/340; 713/601

(58) Field of Classification Search ................ 455/41.1, 455/572, 574, 127.5, 73, 342.1–343.5, 550.1, 455/564, 566; 713/323, 340, 310, 321, 601; 235/492, 380, 441, 442, 487, 495; 327/276, 327/291, 141, 198, 293, 299, 333; 365/194, 365/189.05, 189.12, 198, 229, 233.15, 233.5, 365/226, 227, 233.14; 395/707, 750, 575; 465/100, 233.14; 708/312, 490, 230; 345/100, 345/211

See application file for complete search history.

(56) References Cited

U.S. PATENT DOCUMENTS 5,083,266 A * 1/1992 Watanabe .................... 713/601

(Continued)

FOREIGN PATENT DOCUMENTS

| DE | 100 07 284 A1 | 8/2001 |
|---|---|---|
| EP | 1 065 626 A1 | 1/2001 |

OTHER PUBLICATIONS

ETSI TS 100 977 V8.3.0 (Aug. 2000) Technical Specification; Digital cellular telecommunications system (Phase 2+); Specification of the Subscriber Identity Module—Mobile Equipment (SIM-ME) interface (GSM 11.11 version 8.3.0 Release 1999).

Primary Examiner—Nay A Maung
Assistant Examiner—Paul P Tran
(74) Attorney, Agent, or Firm—Dickstein, Shapiro, LLP.

(57) ABSTRACT

A method for operating a data storage medium when changing from an operating mode to a directly subsequent power-saving quiescent mode, where the operating mode effects a transmission delay for the last item of information which is to be transmitted, so that immediately after the last item of information which is to be transmitted has been transmitted the quiescent mode is activated and the maximum permissible power consumption is observed.

9 Claims, 1 Drawing Sheet

U.S. PATENT DOCUMENTS

| | | |
|---|---|---|
| 5,247,164 A | 9/1993 | Takahashi |
| 5,406,064 A | 4/1995 | Takahashi |
| 5,410,714 A * | 4/1995 | Yorimoto et al. ............ 713/323 |
| 6,374,315 B1 * | 4/2002 | Okada et al. ................. 710/62 |
| 7,013,401 B2 * | 3/2006 | Shimizu et al. ............. 713/322 |
| 2002/0104890 A1 * | 8/2002 | Yoshimoto et al. .......... 235/492 |
| 2003/0160645 A1 * | 8/2003 | Eto et al. .................... 327/276 |
| 2003/0189868 A1 * | 10/2003 | Riesenman et al. ......... 365/226 |

* cited by examiner

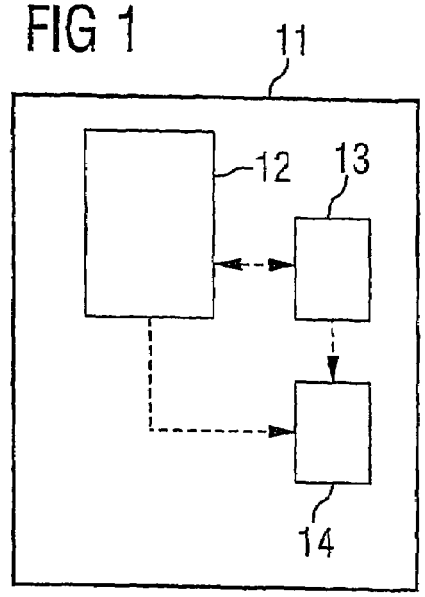
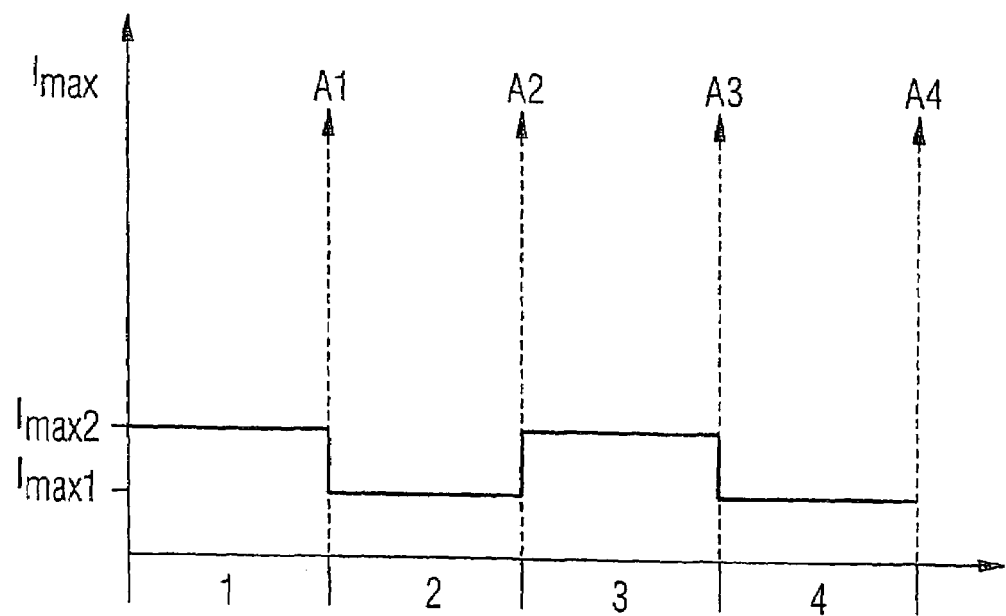

METHOD FOR OPERATING A DATA STORAGE MEDIUM

CROSS-REFERENCE TO RELATED APPLICATION

This application is a continuation of International patent application Ser. No. PCT/DE2004/000431, filed Mar. 5, 2004, which published in German on Sep. 16, 2004 as WO 2004/079645, and is incorporated herein by reference in its entirety.

FIELD OF THE INVENTION

The present invention relates to a method for operating a data storage medium when changing from an operating mode to a directly subsequent power-saving quiescent mode.

BACKGROUND OF THE INVENTION

Such data storage media can be used, by way of example, in mobile communication systems which are used by mobile subscribers for mobile access. The mobile communication systems comprise the mobile appliance itself and a GSM-specific (Global System for Mobile Communications) data storage medium, known as the SIM (Subscriber Identification Module) unit. A subscriber's SIM unit turns a mobile appliance into a complete mobile communication system, carries secret authentication information for the network operator and additionally contains user-specific data.

The data storage medium is supplied with voltage by means of a battery. To prevent rapid battery exhaustion, power-saving methods are used. If operation of the data storage medium is not required, it can be changed from a normal operating mode to a quiescent mode, known as standby mode. In the quiescent mode, circuit parts of the data storage medium which are not required, such as the CPU, the memory and the peripheral units, can be operated in a mode which results in as low a drawn current as possible. Only the circuit parts which are relevant to activation of the operating mode, for example a communication module and a control unit, remain active and require the full supply of current. Since the time in the quiescent mode in the case of battery-operated data storage media is generally a multiple of the time in the operating mode, this allows the current drawn and hence the maximum power consumption to be minimized in the standby mode and allows considerable extension of the use time of the battery or of the battery's life.

The European Telecommunications Standards Institute (ETSI) is the standardization institute for European telecommunication companies and concerns itself with standardization in the field of European telecommunication. The most important ETSI standard in the field of data storage media is the GSM standards series. "ETSI TS 100 977 V8.3.0 (2000-08) Technical Specification, Digital Cellular Telecommunications Systems (Phase 2+); Specification of the Subscriber Identity Module-Mobile Equipment (SIM-ME) interface (GSM 11.11 version 8.3.0 Release 1999)" describes the specification for communication between SIM card and mobile appliance.

Since the majority of the manufacturers of mobile radios and SIM cards adhere to the specifications cited here when manufacturing the hardware and software for the mobile radios and SIM cards, quasi-standardization has been effected on the market. For the data storage medium or the SIM unit, it is necessary to ensure the demand described in the ETSI on the maximum power consumption in the quiescent mode. In this context, the state of the quiescent mode is defined precisely at the instant at which the data storage medium has transmitted a last item of information or a last byte of a response to a preceding command.

Normally, activation of the quiescent mode after the last item of information has been transmitted requires a series of actions, such as the securing of registers in hardware components and the disconnection of electronic modules from the supply voltage, which result in the maximum power consumption demanded in the standard being exceeded for a defined instant and in the standard being infringed.

New technologies in the manufacture of the data storage media entail higher leakage currents when changing from an operating mode to a subsequent quiescent mode in comparison with previous technologies, which means that the specification regarding maximum power consumption in the quiescent mode is no longer observed.

SUMMARY OF THE INVENTION

A method for operating a data storage medium when changing from an operating mode to a directly subsequent power-saving quiescent mode, the method comprising the step of effecting a transmission delay for a last item of information which is to be transmitted during the operating mode.

BRIEF DESCRIPTION OF THE DRAWINGS

An exemplary embodiment of the invention is explained in more detail below with reference to the figures, in which:

FIG. 1 shows a block diagram of a data storage medium for carrying out the inventive method; and FIG. 2 shows a state diagram to illustrate the maximum power consumption in the operating mode and in the quiescent mode.

DETAILED DESCRIPTION OF PREFERRED EMBODIMENTS OF THE INVENTION

It is an object of the invention to propose a method for operating a data storage medium in which the demanded specification for the maximum power consumption of a power-saving quiescent mode which comes directly after an operating mode is met reliably using simple measures.

The object is achieved by a method in which the operating mode effects a transmission delay for the last item of information which is to be transmitted.

This has the advantage that immediately after the last item of information which is to be transmitted has been transmitted the data storage medium's quiescent mode is activated and a maximum power consumption based on the standard is not exceeded.

Since the data storage medium is, by definition, in the quiescent mode precisely from the instant at which the last item of information or the last byte of the response to a possible preceding command has been transmitted, and hence a demanded maximum power consumption needs to be observed, the operating mode advantageously delays the transmission of the last item of information which is to be transmitted.

By way of example, the data storage medium has a communication module and a control unit, which are also active in the quiescent mode, so that the data storage medium can be awoken externally. Information to be transmitted is normally transmitted to the outside via the communication module.

When a CPU initiates the transfer of a last item of information to the communication module, a control signal is advantageously also transferred to the communication module, and this control signal indicates to the communication module that before a further control signal arrives it is necessary to delay the transfer of the last item of information and that this transfer therefore does not take place.

At the same time as the last item of information to be transmitted is transferred to the communication module by the CPU, the quiescent mode is activated, this being initiated and monitored by the control unit. Not until activation has taken place does the control unit generate a control signal which is transmitted to the communication module, so that the latter transmits the last item of information which is to be transmitted.

One particular advantage is that a user or programmer himself is able to decide whether or not the data storage medium's transmission delay needs to be activated.

FIG. 1 shows the block diagram of a data storage medium 11 for carrying out the inventive method. The data storage medium 11 has an arrangement 12, which comprises a CPU, memory units and peripheral units, for example, a control unit 13, for example a "sleep mode manager", and a communication module 14. To save electrical power in states in which operation of the data storage medium 11 is not required, the data storage medium can be changed from a normal operating mode to a power-saving quiescent mode. In this case, the arrangement 12 is disconnected, in particular, since it results in a high drawn current. Only the control unit 13 and the communication module 14, which are required for activating the operating mode, remain active. This drastically reduces the drawn current and hence the maximum power consumption in the quiescent mode.

Information which is to be transmitted is generally forwarded via the communication module 14. Since the quiescent mode begins precisely at the instant at which the communication module 14 has transmitted the last item of information in the response to a preceding command, the communication module 14 is informed, by means of the transfer of the last item of information which is to be transmitted by the CPU in the arrangement 12 using the control signal, that it is not yet possible to transmit.

When the last item of information is transferred to the communication module 14, an item of information is simultaneously sent to the control unit 13, which then initiates the quiescent mode in the arrangement 12, with the arrangement 12 securing any registers and being disconnected from the supply voltage. Once the quiescent mode has been activated, the control unit 13 generates a control signal to the communication module 14, so that the latter transmits the last information. Hence, extensive parts of the data storage medium 11 are disconnected immediately after the last item of information has been transmitted, which means that the demanded power consumption in the quiescent mode can be observed without a time delay.

FIG. 2 shows a state diagram to illustrate the maximum power consumption in the operating mode and in the quiescent mode of the data storage medium 11. In particular, the maximum drawn current Imax1 and Imax2 in a normal operating mode's and a power-saving quiescent mode's states 1 to 4, which occur alternately, and also the transitions A1 to A4 between said states are shown. Starting from the normal operating state 1, 3, the last item of information is transmitted and hence the quiescent mode's state 2, 4 is simultaneously activated, as described previously. For the total period of the quiescent mode's state 2, 4, a maximum drawn current Imax1 must not be exceeded. The inventive method means that the transmission of the last item of information is delayed in the operating mode's state 1, 3 until the arrangement 12 is disconnected and hence the quiescent mode is activated, which means that the maximum drawn current Imax1 is not exceeded at the transition A1, A3 to the quiescent mode's state 2, 4.

The invention is not limited just to the exemplary embodiment described above. In particular, the invention can be applied not only to a data storage medium of the type described above, for example the SIM unit, but rather generally to systems which need to be changed over from a normal operating mode to a power-saving quiescent mode. It is thus conceivable to apply the invention not just to battery-operated systems but also to mains-operated systems in order to lower the power consumption in the quiescent mode and to observe the maximum power consumption in the quiescent mode.

What is claimed is:

1. A method for operating a data storage medium when changing from an operating mode to a directly subsequent power-saving quiescent mode, the method comprising:
   transmitting information during the operating mode of the data storage medium;
   delaying a transmission for a last item of information during the operating mode of the data storage medium;
   initiating a power down for the power-saving quiescent mode of the data storage medium once the transmission has been delayed; and
   transmitting the last item of information once the power-saving quiescent mode of the data storage medium is activated.

2. The method as claimed in claim 1, further comprising transmitting, by a communication module which is part of the data storage medium and is active during the quiescent mode, the last item of information.

3. The method as claimed in claim 1, wherein the transfer of the last item of information includes a control signal which delays the transmission of the last item of information.

4. The method as claimed in claim 3, wherein the transmission delay is effected until the quiescent mode is activated.

5. The method as claimed in claim 4, further comprising transmitting, by a control unit, a control signal to the communication module which indicates that the quiescent mode has been activated.

6. The method as claimed in claim 1, wherein the transmission delay can be either turned on or turned off by a user.

7. A system configured to operate a data storage medium when changing from an operating mode to a directly subsequent power-saving quiescent mode, the system comprising:
   a processor;
   a memory communicatively coupled to the processor; and
   software executing in the processor configured to transmit information during the operating mode of the data storage medium, configured to delay a transmission for a last item of information during the operating mode of the data storage medium, configured to initiate a power down for the power-saving quiescent mode of the data storage medium once the transmission has been delayed, and configured to generate a control signal once the power-saving quiescent mode of the data storage medium is activated causing the last item of information to be transmitted.

8. A system for operating a data storage medium when changing from an operating mode to a directly subsequent power-saving quiescent mode, the system comprising:
   means for transmitting information during the operating mode of the data storage medium;

means for delaying a transmission for a last item of information during the operating mode of the data storage medium;

means for initiating a power down for the power-saving quiescent mode of the data storage medium once the transmission has been delayed;

a communication means, which is part of the data storage medium and is active in the quiescent mode of the data storage medium, for transmitting the last item of information; and means for transmitting the last item of information once the power-saving quiescent mode of the data storage medium is activated.

9. The system as claimed in claim 8, further comprising a control means for transmitting a control signal to the communication means indicating that the quiescent mode has been activated.

* * * * *